United States Patent
Last et al.

(10) Patent No.: US 10,596,926 B2
(45) Date of Patent: Mar. 24, 2020

(54) SEAT TRACKING SYSTEM

(71) Applicant: Textron Aviation Inc., Wichita, KS (US)

(72) Inventors: Brent William Last, Wichita, KS (US); Gregory Lynn Ellis, Clearwater, KS (US)

(73) Assignee: Textron Innovations, Inc., Providence, RI (US)

( * ) Notice: Subject to any disclaimer, the term of this patent is extended or adjusted under 35 U.S.C. 154(b) by 19 days.

(21) Appl. No.: 16/032,247

(22) Filed: Jul. 11, 2018

(65) Prior Publication Data

US 2019/0031049 A1    Jan. 31, 2019

Related U.S. Application Data

(60) Provisional application No. 62/537,070, filed on Jul. 26, 2017.

(51) Int. Cl.
| | | |
|---|---|---|
| *B60N 2/07* | (2006.01) | |
| *B64D 11/06* | (2006.01) | |
| *B60N 2/14* | (2006.01) | |
| *B60N 2/06* | (2006.01) | |

(52) U.S. Cl.
CPC ........... *B60N 2/0735* (2013.01); *B60N 2/062* (2013.01); *B60N 2/14* (2013.01); *B64D 11/064* (2014.12); *B64D 11/0639* (2014.12); *B64D 11/0648* (2014.12); *B64D 11/0696* (2013.01)

(58) Field of Classification Search
CPC ........ B60N 2/0735; B60N 2/062; B60N 2/14; B64D 11/0639; B64D 11/0648; B64D 11/0696
See application file for complete search history.

(56) References Cited

U.S. PATENT DOCUMENTS

| | | | |
|---|---|---|---|
| 5,083,726 A | 1/1992 | Schurr | |
| 6,691,970 B1 * | 2/2004 | Sutton, Sr. ............. | B60N 2/062 248/425 |
| 7,568,675 B2 * | 8/2009 | Catton ................... | B60N 2/502 248/421 |
| 7,975,979 B2 | 7/2011 | Bishop | |
| 8,403,415 B2 | 3/2013 | Lawson | |

(Continued)

FOREIGN PATENT DOCUMENTS

WO     2017001845 A1    1/2017

*Primary Examiner* — Anita M King
(74) *Attorney, Agent, or Firm* — Erise IP, P.A.

(57) ABSTRACT

A seat tracking system includes a longitudinal tracking member mechanically coupled to a first portion of a seat, and a tracking block mechanically coupled to a second portion of the seat. The tracking block includes a bore that is adapted to receive the tracking member, such that the tracking member slides within the tracking block to enable the first portion and the second portion to slide longitudinally with respect to each other. At least one stand is mechanically coupled to the second portion of the seat and has a through-hole that is adapted to receive a lateral tracking member, which is mechanically coupled to the first portion of the seat. The lateral tracking member enables the first portion and the second portion to slide longitudinally with respect to each other. A swivel plate mechanically couples the at least one stand to a seat base such that the seat is rotatable.

21 Claims, 12 Drawing Sheets

(56) References Cited

U.S. PATENT DOCUMENTS

| | | | |
|---|---|---|---|
| 8,419,123 B2 | 4/2013 | Hankinson et al. | |
| 8,556,221 B2 * | 10/2013 | Kohen | B60N 2/072 248/424 |
| 9,908,446 B2 * | 3/2018 | Davis | B64D 11/064 |

* cited by examiner

SEAT TRACKING SYSTEM

CROSS-REFERENCE TO RELATED APPLICATIONS

This application claims the benefit of U.S. Provisional Patent Application Ser. No. 62/537,070 entitled Seat Tracking System and filed Jul. 26, 2017, the disclosure of which is herein incorporated by reference in its entirety.

BACKGROUND

1. Field

Embodiments of this disclosure relate generally to the field of vehicle seats, and more specifically to providing linear motion of a seat both laterally and longitudinally.

2. Description of the Related Art

Passenger seats traditionally use linear ball bearings to enable seat base tracking for adjusting seat configurations. Many prior art systems disclose passenger seat adjustment mechanisms. For example, U.S. Pat. No. 8,419,123 to Hankinson et al. discloses an aircraft seat having bearing wheels which act as rolling element bearings and are configured for rolling within grooves of an interconnection beam for translating a sub-frame of the seat. International Publication WO 2017/001845 to Jones discloses an aircraft passenger seat mechanism having a pinion that engages a rack located in a guide track, such that the pinion follows the path of the guide track as it is driven. U.S. Pat. No. 8,403,415 to Lawson discloses an adjustable passenger seat having a seat recline mechanism including a seat base with a translation guide assembly that carries first and second guides corresponding to first and second guideslots, respectively. U.S. Pat. No. 5,083,726 to Schurr discloses an airplane seat track bearing for securing a seat leg to a floor. U.S. Pat. No. 7,975,979 to Bishop discloses an airplane seat track with a slide track having receptacles configured for receiving side tabs coupled to the bottom of a seat leg via a fitting.

SUMMARY

In an embodiment, a tracking system is provided. The tracking system includes a longitudinal member that is mechanically coupled to a first structure, and a block that is mechanically coupled to a second structure. The block includes a bore that passes longitudinally through the block and is adapted to receive the longitudinal member, a plain bearing that is mounted inside the bore for contacting the longitudinal member, and a pair of opposing rollers mounted inside the bore for contacting the longitudinal member. The longitudinal member slides within the bore to enable the first structure to translate with respect to the second structure.

In another embodiment, a seat tracking system is provided. The seat tracking system includes a tracking member that extends longitudinally and is mechanically coupled to a first portion of a seat, and a tracking block that is mechanically coupled to a second portion of the seat. The tracking block includes a bore that passes longitudinally through the tracking block and is adapted to receive the tracking member. At least one plain bearing is mounted inside the bore for contacting the tracking member, and at least one pair of opposing rollers is mounted inside the bore for contacting the tracking member, such that the tracking member slides within the tracking block to enable the first seat portion and the second seat portion to slide with respect to each other.

In yet another embodiment, a rotatable seat tracking system is provided. The rotatable seat tracking system includes a swivel plate pivotally mounted to a seat base. The swivel plate includes at least one stand having a through-hole, a first roller supported in the at least one stand and exposed within a lower portion of the through-hole, a second roller supported in the at least one stand opposite the first roller and exposed within an upper portion of the at least one through-hole, and a plain bearing mounted inside the at least one through-hole. A tracking member is mechanically coupled to a seat bucket frame and aligned through the at least one through-hole, such that the tracking member glides between the first roller and the second roller and is guided by the plain bearing to enable movement of the seat bucket frame with respect to the seat base.

In still another embodiment, a lateral and longitudinal seat tracking system is provided. The lateral and longitudinal seat tracking system includes a stand having a through-hole. The stand is mechanically coupled to a seat base. The system further includes a lateral tracking member aligned through the through-hole, such that the lateral tracking member is laterally moveable within the through hole. A block is mechanically coupled to the lateral tracking member, such that the block is laterally moveable, and a longitudinal tracking member is mechanically coupled to a seat bucket frame. The block has a bore oriented longitudinally that is adapted to receive the longitudinal tracking member, such that the longitudinal tracking member is longitudinally moveable through the bore for moving the seat bucket frame longitudinally, and the block is laterally moveable for moving the seat bucket frame laterally.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Tracking of a seat base is typically accomplished using linear ball bearings mated to round shafts. However, the linear ball bearings produce substantial noise, especially when as many as eight are used per passenger seat. Additionally, each ball bearing contacts a mating surface of the round shaft at a single point, which may wear a groove in the surface of the shaft over time, thus reducing bearing performance and further increasing noise. Once ball bearings begin to wear into the mating surface, fine metal filings may accumulate that exacerbate wear and noise.

Embodiments of the present disclosure provide a tracking system for translating a first structure with respect to a second structure. A combination of a plain bearing and a pair of rollers is used to enable a longitudinal member to pass through a bore of a block with minimal friction and while preventing binding. The longitudinal member is coupled with either the first structure or the second structure, while the block is coupled with the opposite structure to which the longitudinal member is coupled. A plain bearing is mounted inside the bore for contacting the longitudinal member, and a pair of opposing rollers are mounted inside the bore for contacting the longitudinal member. In some embodiments, one of the opposing rollers is nested within a notch of the plain bearing.

In certain embodiments, the tracking system is adapted as a seat tracking system that eliminates the above-mentioned problems with prior seat tracking systems. Instead of using ball bearings, a combination of plain bearings and rollers are used to enable linear seat base tracking. The combination of plain bearings and rollers is configured to withstand eccentric and cantilever loading observed under normal seat operation, thereby preventing binding. Some embodiments enable linear seat base tracking in a longitudinal direction and a latitudinal direction, which is perpendicular to the longitudinal direction. In yet other embodiments, a swivel plate is provided that enables rotation of the seat with respect to the seat base.

Advantages of the disclosed embodiments include reduced weight, noise, and wear, as well as simplified assembly and reduced maintenance. By nesting the plain bearings and rollers into a machined tracking block, the tracking system lacks any joints, which is critical for sustaining forces applied during dynamic seat testing for aircraft.

Figure 1:
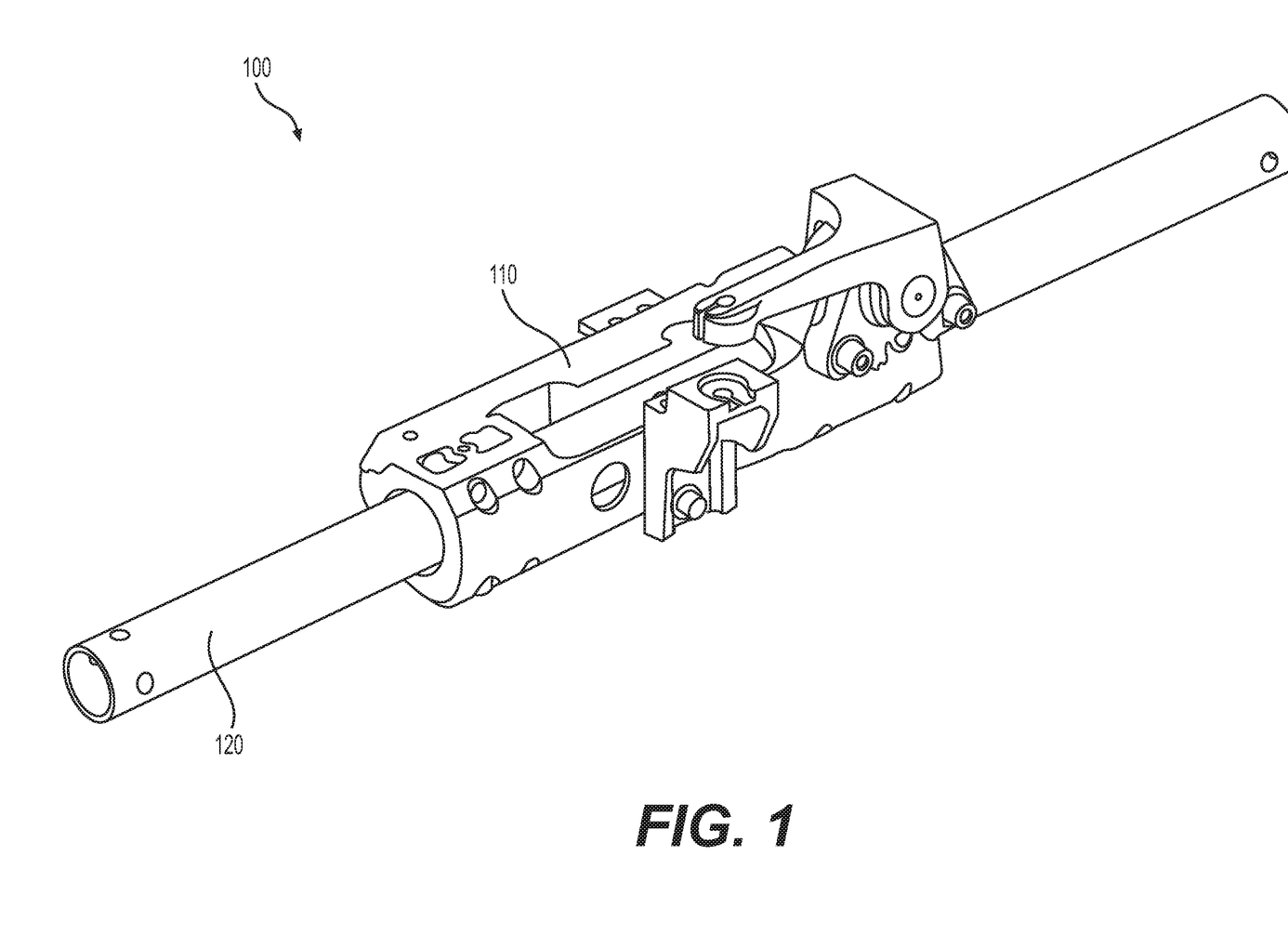
FIG. 1 is a perspective view of a seat tracking system, in an embodiment.

FIG. 1 is a perspective view of a seat tracking system 100. System 100 includes a first tracking block 110 and a longitudinal tracking member 120 arranged through a bore of first tracking block 110 and extending along a longitudinal axis. It should be noted that the use of the term "block" as used herein should not be construed as imparting any particular shape or configuration. The term, instead, should be interpreted as meaning a mass of material of some sort. First tracking block 110 and longitudinal tracking member 120 are operatively coupled for sliding with respect to one another, as further described below. First tracking block 110 may be any component having a bore configured to receive longitudinal tracking member 120. In an embodiment, first tracking block 110 is machined from a single piece of material such that no joints exist. Longitudinal tracking member 120 may be a shaft, tube, rod, or rail having a substantially round or substantially rectangular cross-sectional shape configured for fitting longitudinally through the bore of first tracking block 110. The bore may be a substantially round or substantially rectangular hole, slot, or groove configured for receiving tracking member 120.

Figure 2:
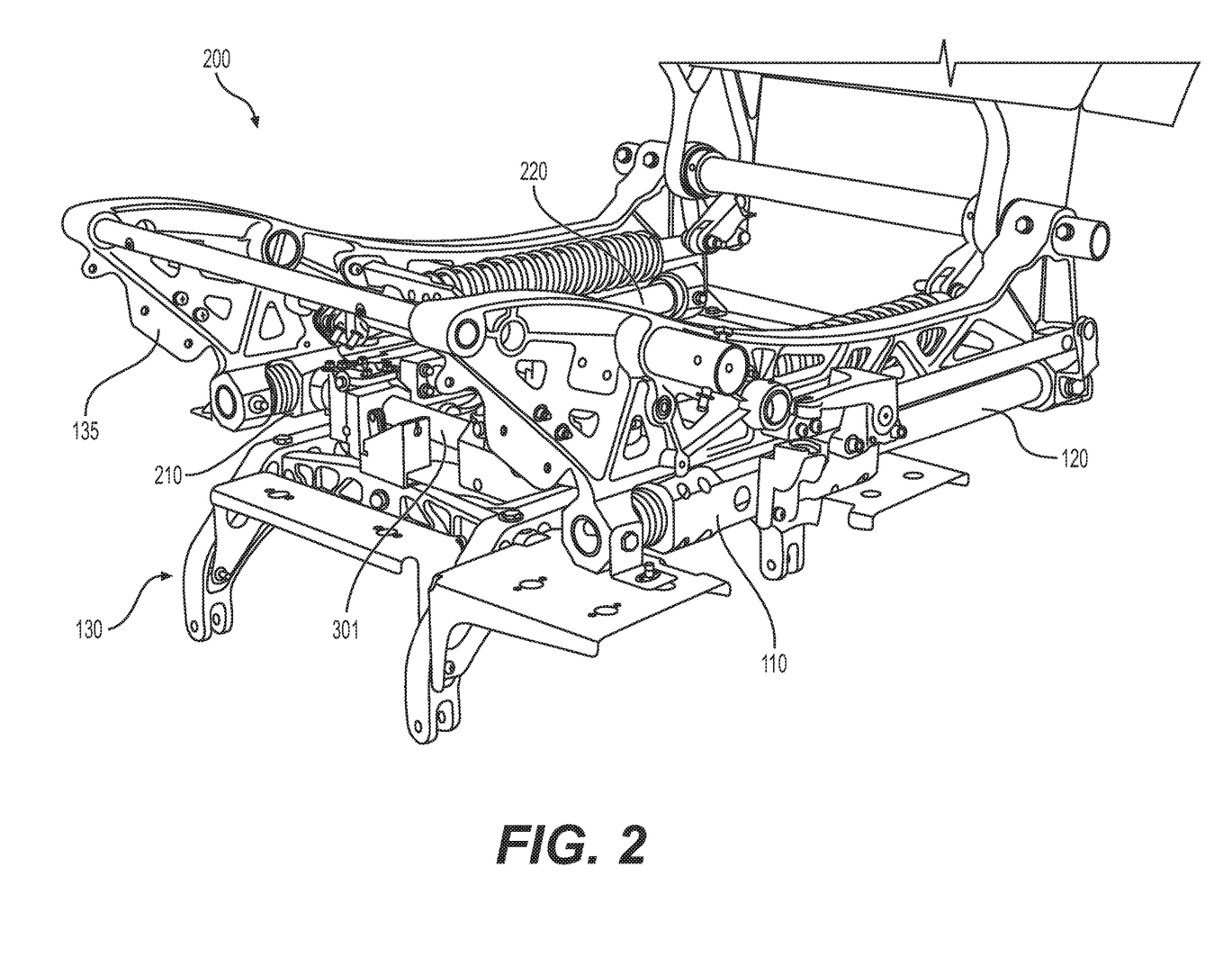
FIG. 2 is a perspective view of the seat tracking system of FIG. 1 operatively coupled to a seat.

FIG. 2 is a perspective view showing a seat 200 with first tracking block 110 and longitudinal tracking member 120 operatively coupled to a seat base 130 and a bucket frame 135, respectively. Bucket frame 135 is for example a seat frame for supporting a seat bottom (not shown for clarity of illustration). Seat base 130 is mountable to a floor and is adapted for supporting bucket frame 135. Bucket frame 135 is adapted for moving laterally and longitudinally with respect to seat base 130, while seat base 130 remains stationary.

A first lateral tracking member 301 is adapted for enabling bucket frame to move laterally with respect to seat base 130, as further described below in connection with FIG. 14. Longitudinal tracking member 120 is adapted for enabling bucket frame 135 to move longitudinally with respect to seat base 130, as further described below in connection with FIG. 3. A second tracking block 210 may be positioned opposite first tracking block 110 and adapted for receiving a second longitudinal tracking member 220. A releasable locking mechanism (not shown) may be used to secure seat 200 in a desired longitudinal position.

Figure 3:
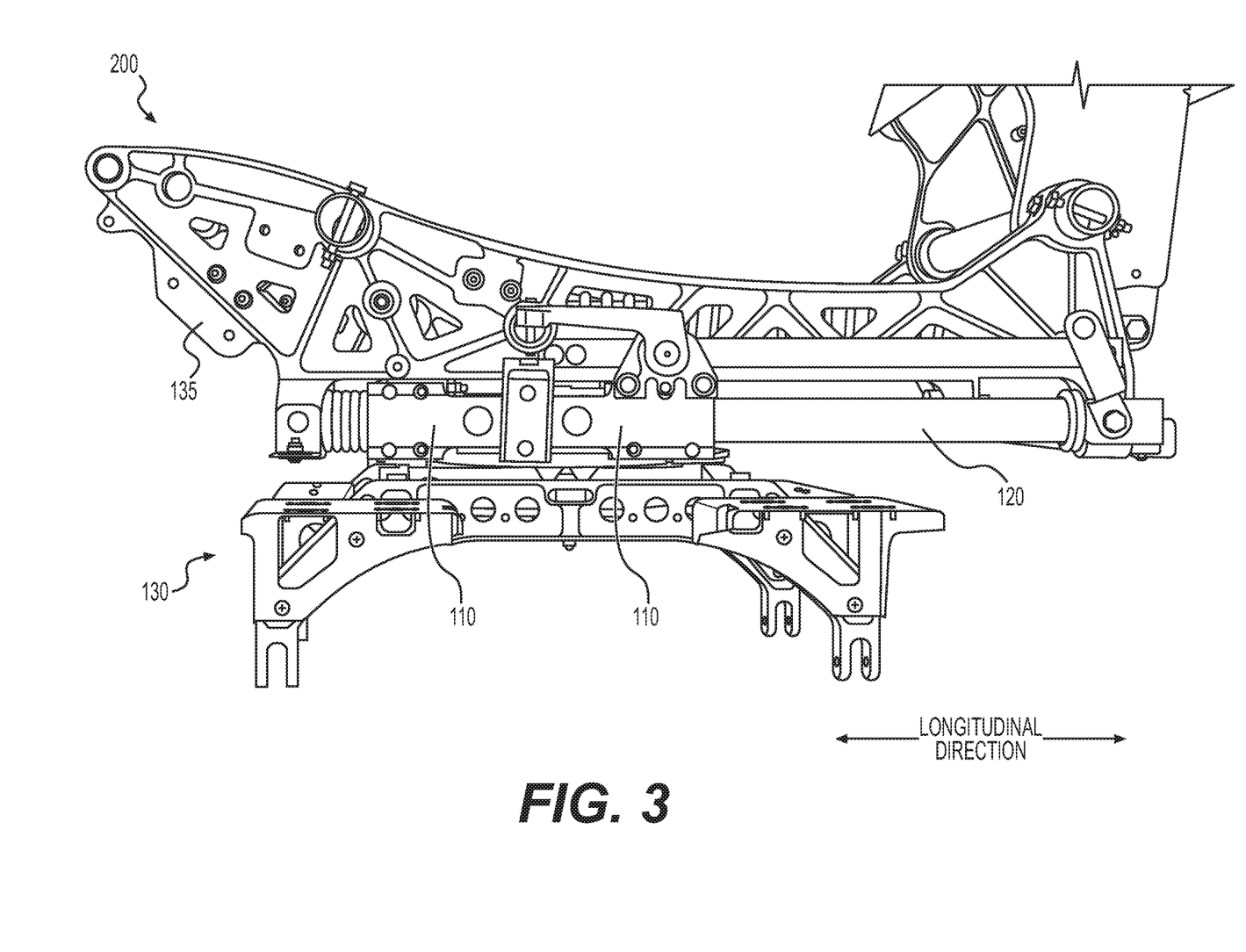
FIG. 3 is a side view of the seat tracking system of FIG. 1 operatively coupled to a seat.

FIG. 3 is a side view showing first tracking block 110 and longitudinal tracking member 120 operatively coupled to seat base 130 and bucket frame 135. As depicted in FIG. 3, longitudinal tracking member 120 is aligned in the longitudinal direction. In the embodiment shown in FIGS. 2 and 3, first tracking block 110 is mechanically coupled to seat base 130, and longitudinal tracking member 120 is mechanically coupled to bucket frame 135.

As one of skill in the art will recognize, an alternative configuration may be formed with first tracking block 110 attached to bucket frame 135 and longitudinal tracking member 120 attached to seat base 130. Both configurations enable longitudinal movement of bucket frame 135 with respect to seat base 130. Thus, any configuration having first tracking block 110 attached to a first seat portion and longitudinal tracking member 120 attached to a second seat portion is contemplated, where the first and second seat portions are moveable with respect to one another.

In the embodiment depicted in FIGS. 2 and 3, the first seat portion is bucket frame 135, and the second seat portion is seat base 130, such that longitudinal tracking member 120 slides longitudinally while first tracking block 110 remains stationary.

Figure 4:
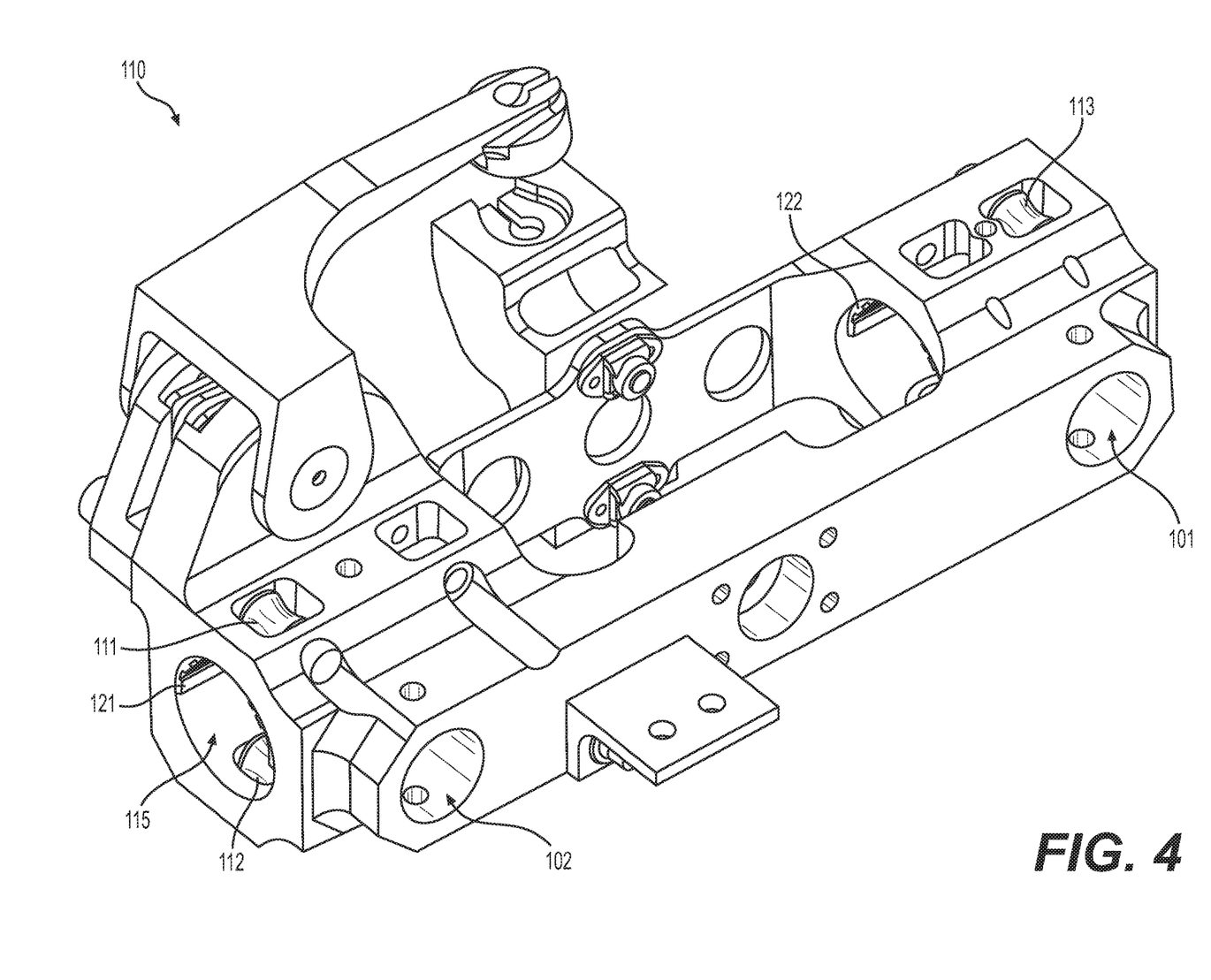
FIG. 4 is a perspective view of a tracking block of the seat tracking system, in an embodiment.

FIG. 4 is a perspective view showing first tracking block 110 including a first roller 111, a second roller 112, and a third roller 113, a first plain bearing 121 and a second plain bearing 122, and a bore 115. A fourth roller 114 (see FIG. 5) is located below third roller 113 but is not visible from the perspective view of FIG. 4. Bore 115 extends longitudinally through the entire length of first tracking block 110 forming openings at both ends. Longitudinal tracking member 120 is configured to pass through bore 115, as depicted in FIG. 1. First and second plain bearings 121, 122 each provide a low-friction surface that enables smooth movement of, and guides, longitudinal tracking member 120 within first tracking block 110. First, second, third, and fourth rollers 111, 112, 113, 114 provide rolling friction as opposed to sliding friction. Rollers 111-114 accept loads from longitudinal tracking member 120 and allow it to glide smoothly. The combination of rollers and plain bearings provides stability of longitudinal tracking member 120 throughout the entire bore 115.

Figure 13:
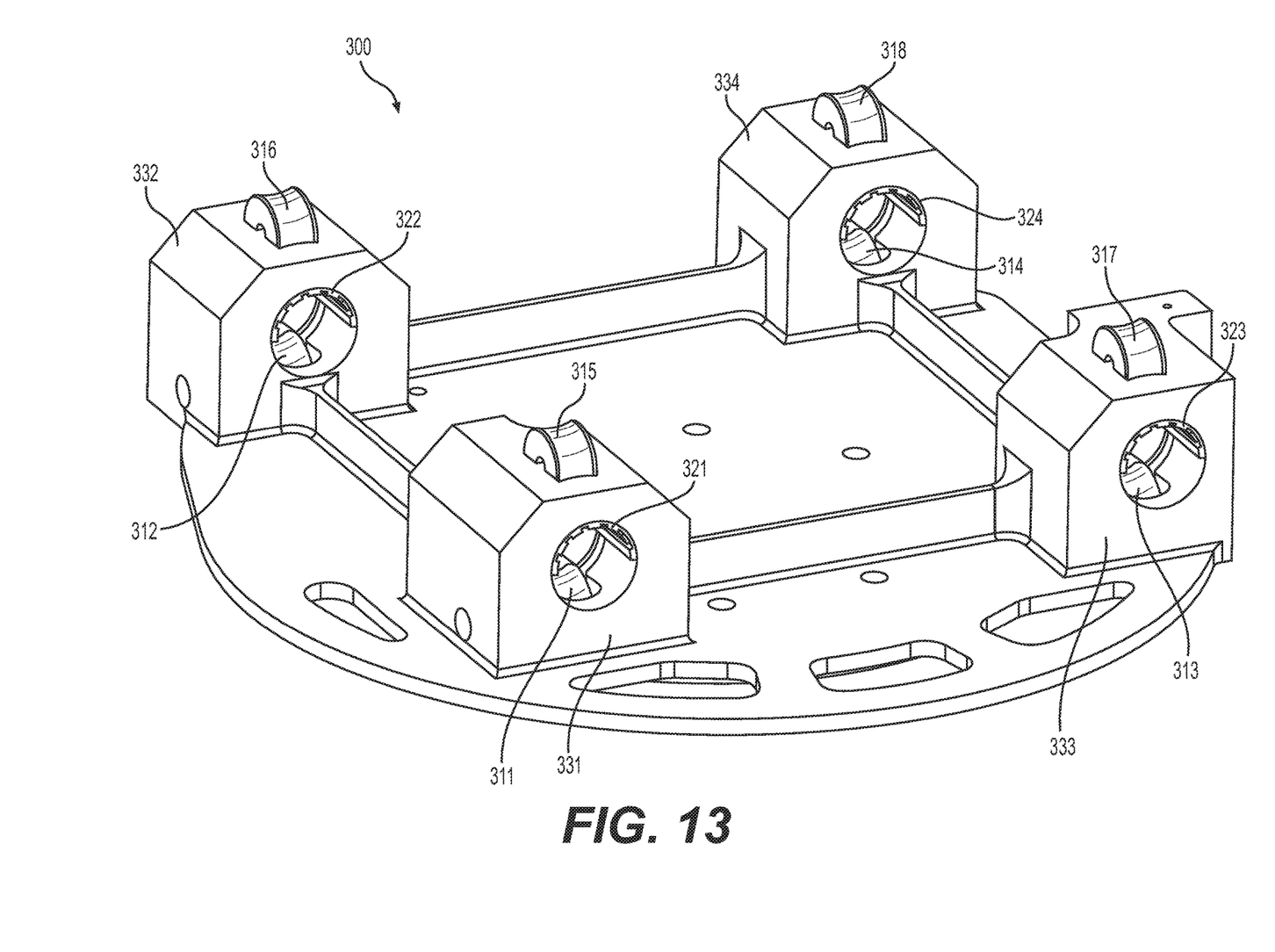
FIG. 13 is a perspective view of a swivel plate used for lateral tracking and rotating, in an embodiment.
Figure 14:
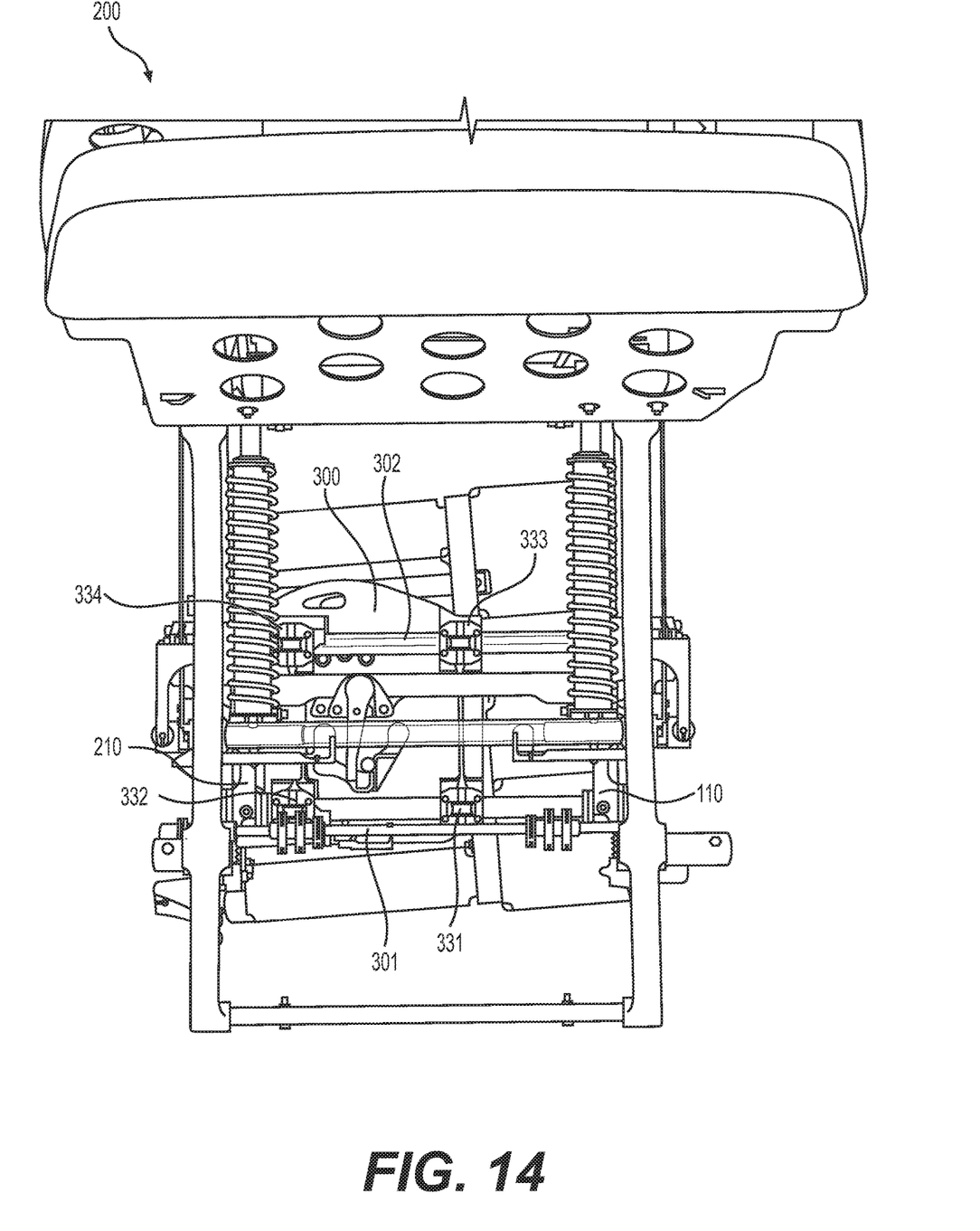
FIG. 14 is a perspective view of the swivel plate of FIG. 13 operatively coupled to a seat.

In certain embodiments, a first lateral hole 101 is adapted for receiving first lateral tracking member 301 (see FIGS. 2 and 14) and a second lateral hole 102 is adapted for receiving a second lateral tracking member 302 (see FIG. 14). First and second lateral tracking members 301, 302 are received by stands as described below in connection with FIG. 13 that enable lateral movement of first tracking block 110 and second tracking block 210. In this way, bucket frame 135 is moveable both laterally and longitudinally with respect to seat base 130.

Figure 5:
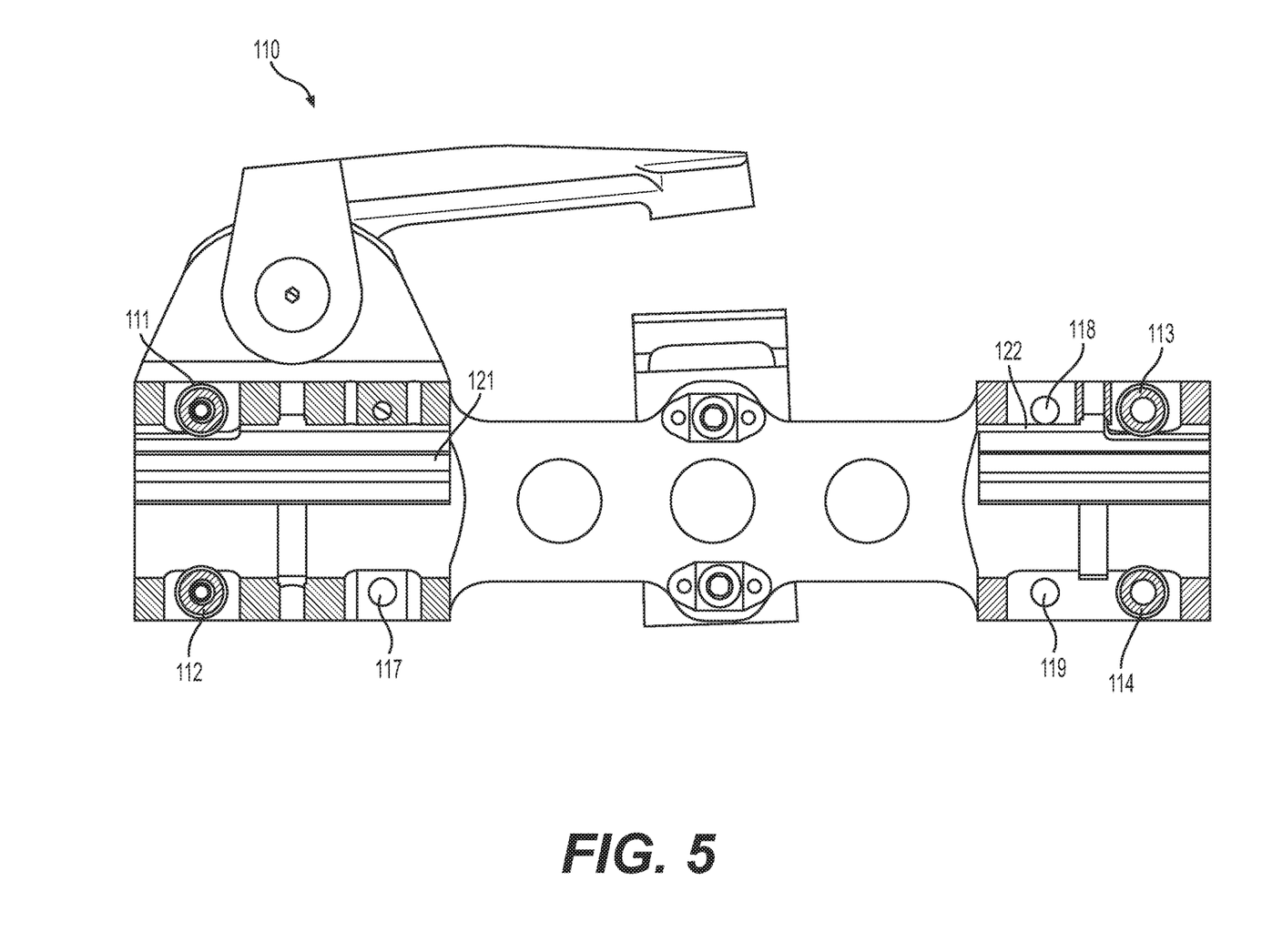
FIG. 5 is a cross-sectional side view of the tracking block of FIG. 4.

FIG. 5 is a cross-sectional side view of first tracking block 110 revealing first roller 111, second roller 112, third roller 113, and a fourth roller 114, as well as first plain bearing 121 and second plain bearing 122. In the embodiment depicted in FIG. 5, second roller 112 is beneath first roller 111, fourth roller 114 is beneath third roller 113, and first and second plain bearings 121, 122 are mounted inside bore 115 along an upper portion of the bore. First plain bearing 121 is located substantially near a first end of bore 115 and second plain bearing 122 is located substantially near a second end of bore 115, opposite the first end. When longitudinal tracking member 120 is inserted into first tracking block 110, first roller 111, third roller 113, and first and second plain bearings 121, 122 are positioned above longitudinal tracking member 120, while second roller 112 and fourth roller 114 are positioned below longitudinal tracking member 120. However, the exact locations of the rollers and plain bearings within first tracking block 110 may be varied without departing from the scope hereof.

Figure 12:
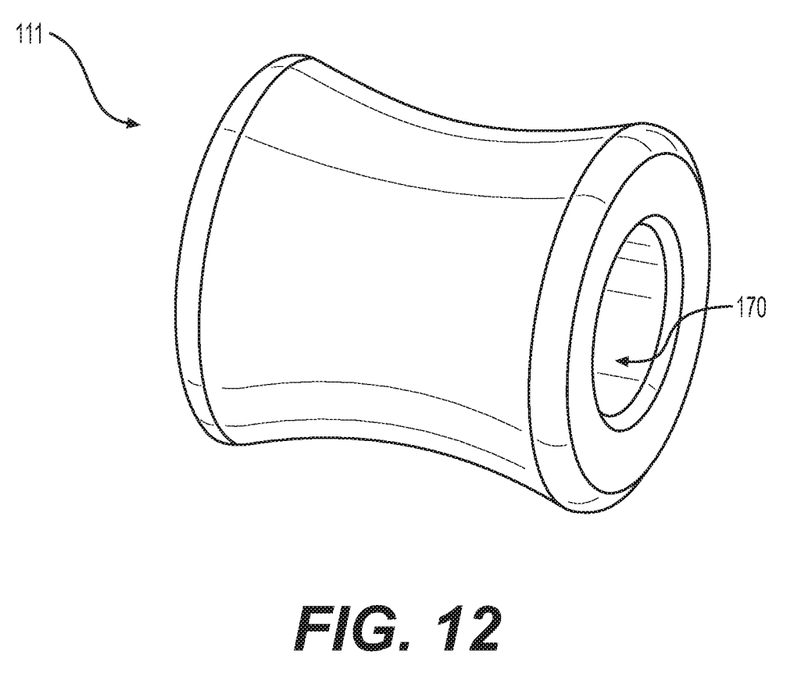
FIG. 12 is a perspective view of a roller, in an embodiment.

Each of first through fourth rollers 111-114 is supported by first tracking block 110 via an axle which passes through an axial bore 170 of each roller, as shown in FIG. 12. First tracking block 110 includes support holes for receiving the axle. Additional support holes (e.g., support holes 117, 118, 119 in FIG. 5) provide alternate locations for installing rollers. In some embodiments, the alternate support holes are used to offset the upper rollers from the lower rollers (e.g., such that the upper rollers are not directly above the lower rollers).

A portion of each roller surface is exposed internally within bore 115 for contacting longitudinal tracking member 120. For the upper rollers, a notch is provided in the plain bearing such that the roller is nested within the plain bearing. For example, first plain bearing 121 includes a notch 160 for receiving first roller 111 and second plain bearing 122 includes notch 160 for receiving third roller 113, as further described below in connection with FIGS. 9 and 11. Notch 160 enables rollers to be exposed internally within bore 115 for contacting longitudinal tracking member 120 in locations that overlap a plain bearing. When the upper rollers are installed in alternate locations (e.g., via support holes 117, 118, 119), the plain bearing may be rotated 180° longitudinally to align its notch with a respective roller.

In operation, under certain conditions, longitudinal tracking member 120 glides on second and fourth rollers 112, 114, while first and third rollers 111, 113 and first and second plain bearings 121, 122 serve as guides. Opposing rollers (e.g., first and second rollers 111, 112) prevent eccentric or cantilever loads, which may be experienced during normal seat operation, from causing binding of longitudinal tracking member 120 within first tracking block 110. More specifically, opposing rollers account for the fact that as a force is applied to one end of longitudinal tracking member 120, the opposite end sees a resultant force in the opposite direction. The orientation of these forces changes depending on where the seat is positioned. This is a critical difference from industry-standard parts, designed for mostly industrial uses.

Because first tracking block 110 does not include any joints, it is configured to withstand loads from a plurality of directions while having an efficient weight.

Figure 6:
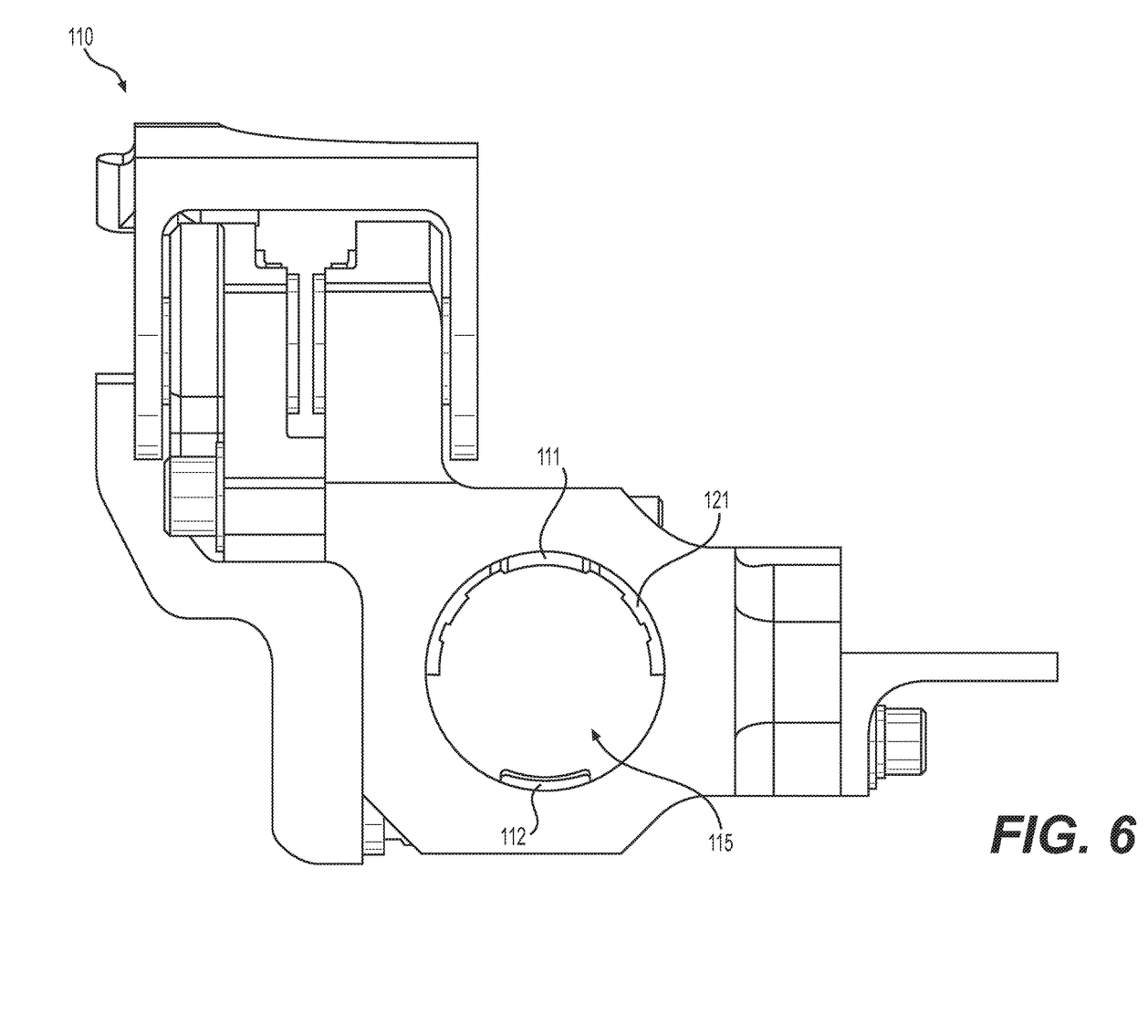
FIG. 6 is an end view of the tracking block of FIG. 4.

FIG. 6 is an end view showing first tracking block 110 with first roller 111, second roller 112, and first plain bearing 121 visible inside bore 115.

Figure 7:
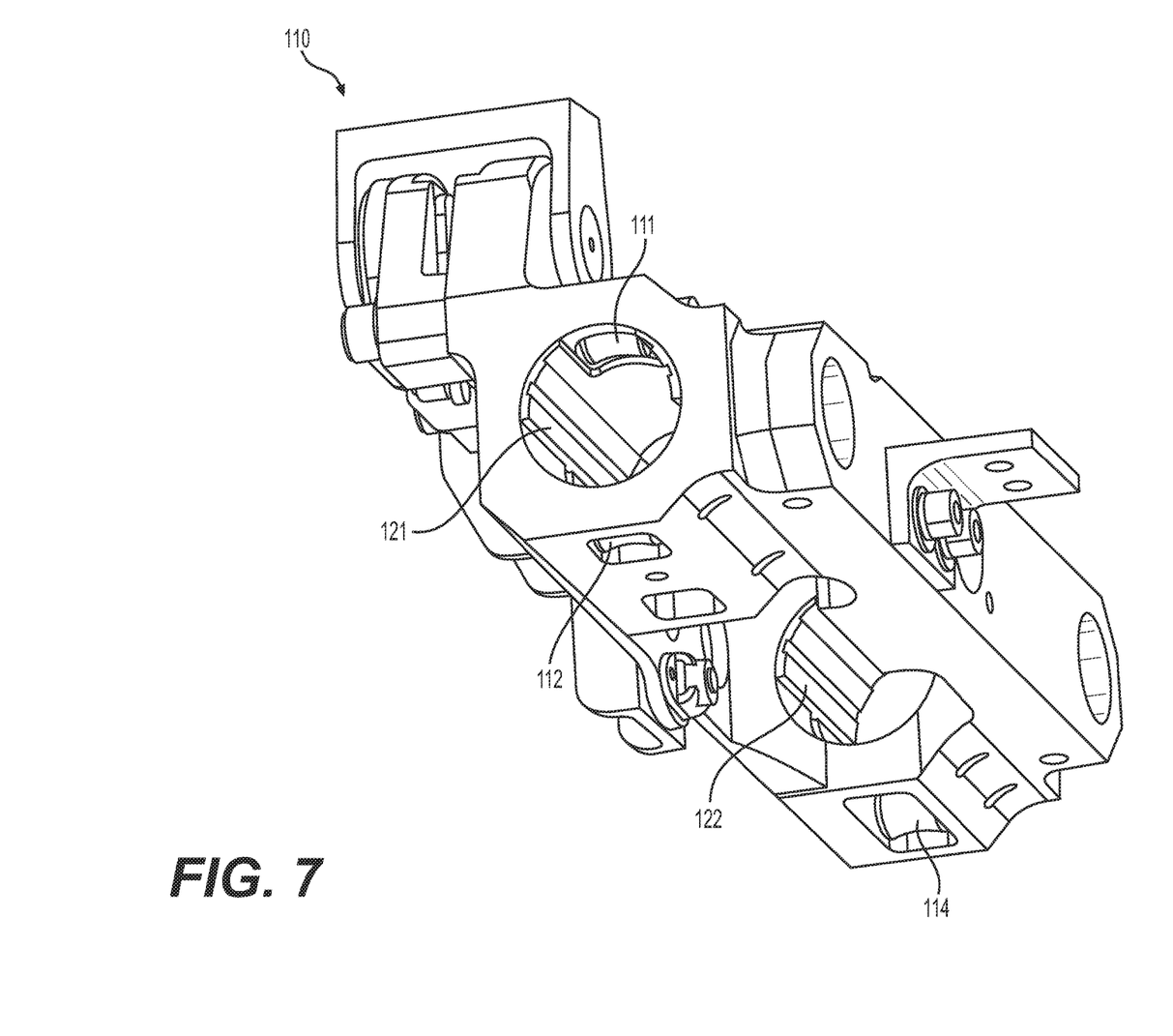
FIG. 7 is an underside perspective view of the tracking block of FIG. 4.

FIG. 7 is a perspective view showing an underside of first tracking block 110 enabling viewing of first and second plain bearings 121, 122 and second and fourth rollers 112, 114. First roller 111 is exposed to bore 115 through the notch in first plain bearing 121.

Figure 8:
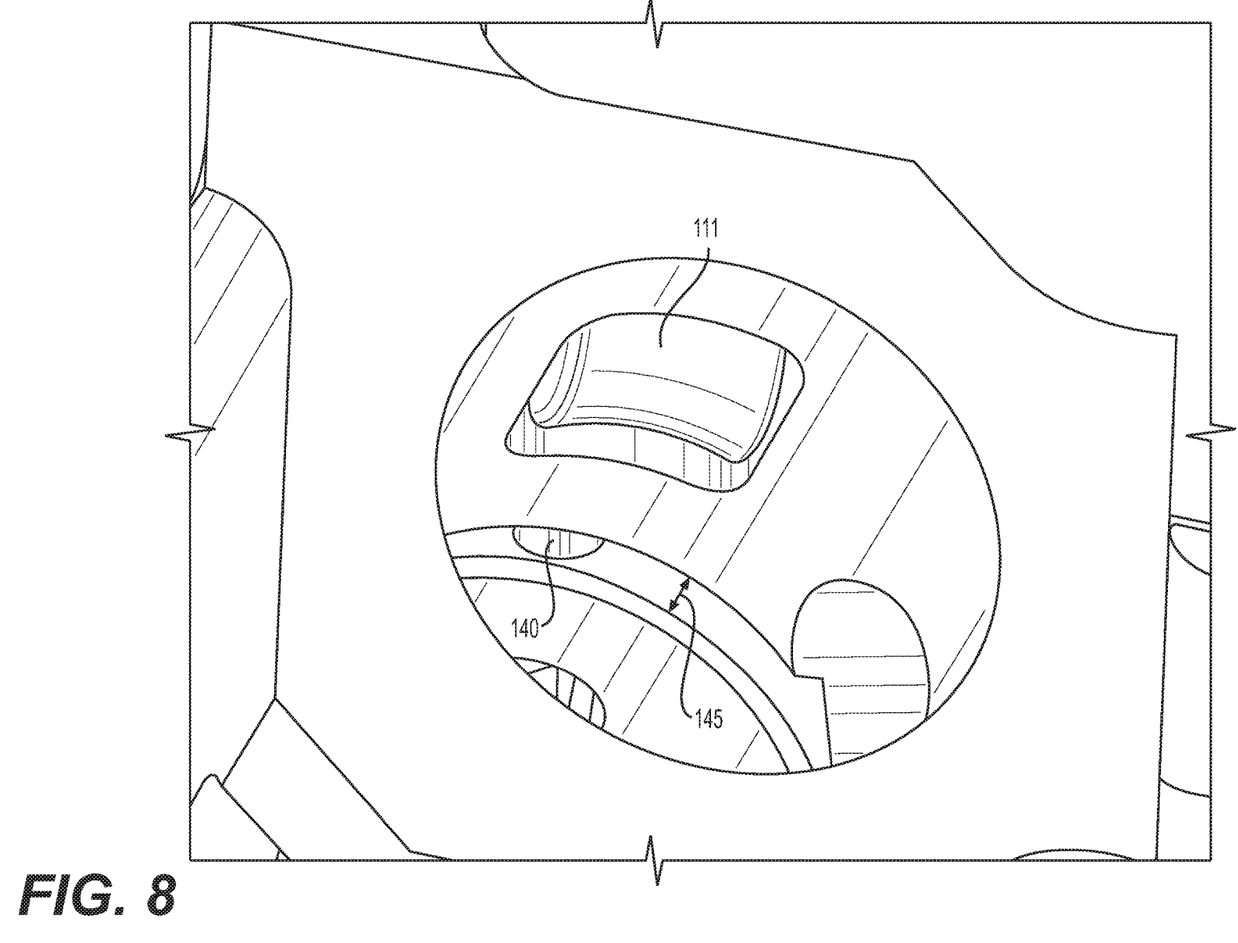
FIG. 8 is a perspective view showing a roller within the tracking block of FIG. 4, in an embodiment.

FIG. 8 is a perspective view showing bore 115 revealing first roller 111. In the view shown in FIG. 8, first plain bearing 121 is removed to enable viewing of a clocking hole 140 and a groove 145 for securing first plain bearing 121, as described below in connection with FIGS. 9 and 10.

Figure 9:
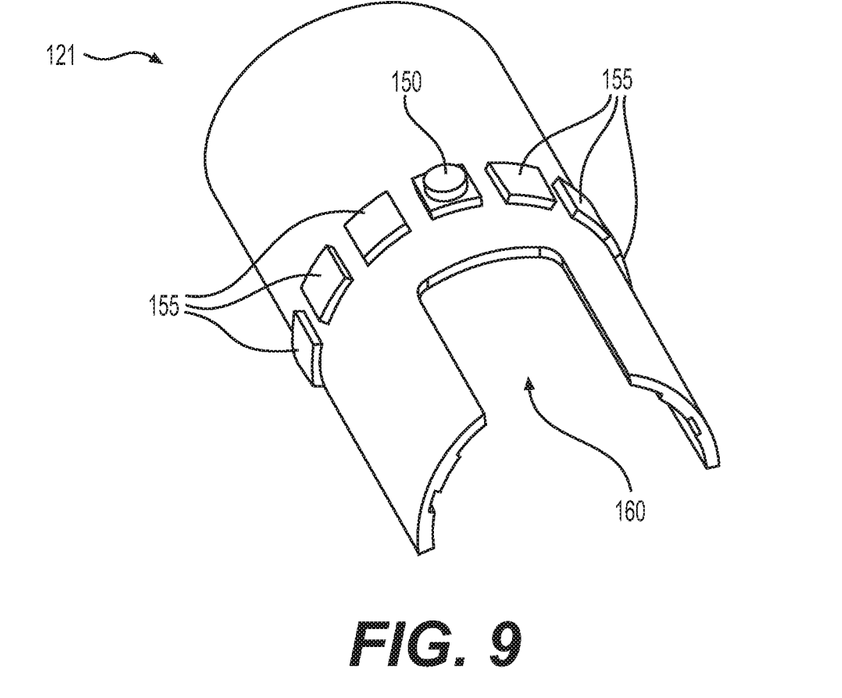
FIG. 9 is a perspective view of a plain bearing, in an embodiment.

FIG. 9 is a perspective view showing an outer side of first plain bearing 121. A notch 160 forms a gap in one end of first plain bearing 121, which is configured for receiving first roller 111, as depicted in FIG. 7. A plurality of raised extensions 155 are aligned concentrically around the outer surface of first plain bearing 121 for inserting into groove 145 of FIG. 8. A clocking protrusion 150 extends from one of the raised extensions 155 and is configured for inserting into clocking hole 140 of FIG. 8. Together, clocking protrusion 150 and raised extensions 155 enable first plain bearing 121 to be snapped into clocking hole 140 and groove 145 for securing first plain bearing 121 inside first tracking block 110. The number, shape and location of clocking hole 140, clocking protrusion 150, groove 145, and raised extensions 155 may be modified without departing from the scope hereof. For example, raised extensions 155 may be merged to form a single ring rather than a plurality of separate extensions. In another example, more than one clocking protrusion 150 may be located along the outer side of first plain bearing with first tracking block 110 having respectively positioned clocking holes 140.

Figure 10:
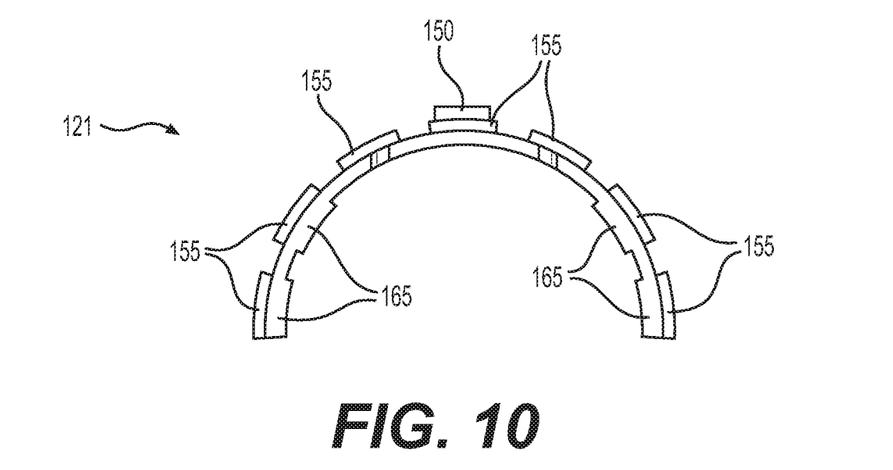
FIG. 10 is an end view of the plain bearing of FIG. 9.

FIG. 10 is an end view showing first plain bearing 121. The plurality of raised extensions 155 and clocking protrusion 150 are visible along the outer surface of first plain bearing 121. Along an inner surface of first plain bearing 121, a plurality of ribs 165 are shown extending from the inner surface, which are best viewed via FIG. 11.

Figure 11:
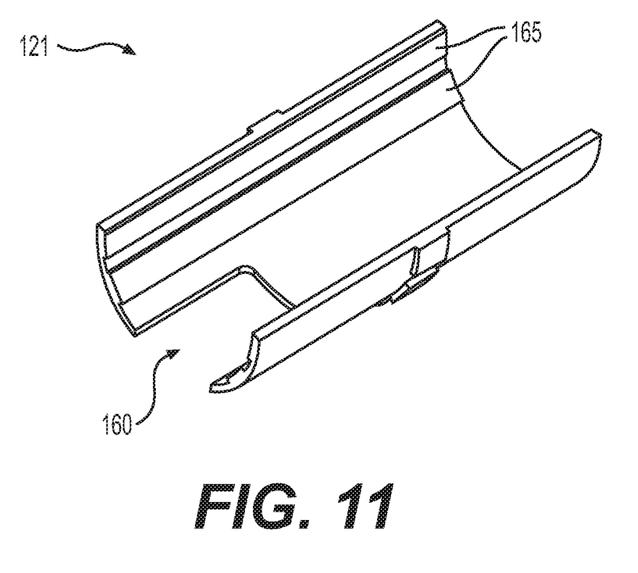
FIG. 11 is another perspective view of the plain bearing of FIG. 9.

FIG. 11 is a perspective view showing the inner side of first plain bearing 121. In an embodiment, the plurality of ribs 165 extend longitudinally along the entire length of first plain bearing 121, as depicted in FIG. 11. The ribs 165 are configured to provide a smooth interface with longitudinal tracking member 120 that enables low friction movement and provides stability for guiding tracking member 120 while it moves with respect to tracking block 110.

FIG. 12 is a perspective view showing first roller 111. An axial bore 170 extends through first roller 111 and is configured to receive an axle for rotating thereabout. In certain embodiments, the rollers have a concave outer cylindrical surface, as depicted for first roller 111 of FIG. 12. The concave surface of the roller is shaped to mate with a round tracking member (e.g., longitudinal tracking member 120, FIG. 1).

FIG. 13 is a perspective view of a swivel plate 300 used for lateral seat tracking. Swivel plate 300 includes a first stand 331, a second stand 332, a third stand 333, and a fourth stand 334, which each include a through-hole configured to receive a tracking member (e.g., longitudinal tracking member 120, FIG. 1). The through-holes are similar to bore 115 of FIGS. 4 and 6.

In the embodiment depicted in FIG. 13, the through-hole of first stand 331 is aligned with the through-hole of second stand 332 to accept a first tracking member (not shown). Similarly, the through-hole of third stand 333 is aligned with the through-hole of fourth stand 334 to accept a second tracking member (not shown). Each pair of aligned stands (e.g., first stand 331 and second stand 332 form a first pair, and third stand 333 and fourth stand 334 form a second pair) are similar to tracking block 110 (e.g., see FIGS. 4 and 5).

Internal to each through-hole is a plain bearing, which are examples of first plain bearing 121, FIGS. 4-12. For example, first stand 331 includes a first plain bearing 321, second stand 332 includes a second plain bearing 322, third stand 333 includes a third plain bearing 323, and fourth stand 334 includes a fourth plain bearing 324. The plain bearings each include notch 160 (see FIGS. 9 and 10) for receiving a roller, such that the roller is nested within the plain bearing (e.g., like first roller 111 is nested within first plain bearing 121 as depicted in FIGS. 5-7).

Each of stands 331-334 also includes a pair of opposing rollers, one above the through-hole and the other below the through-hole, configured for rolling along a tracking member located therebetween. Stands 331-334 support the rollers and are adapted to expose the rollers to the through-hole of each stand such that the tracking member contacts a portion of each roller. For example, a first bottom roller 311 is paired with a first top roller 315 in first stand 331; a second bottom roller 312 is paired with a second top roller 316 in second stand 332; a third bottom roller 313 is paired with a third top roller 317 in third stand 333; and, a fourth bottom roller 314 is paired with a fourth top roller 318 in fourth stand 334. The rollers are examples of first roller 111, FIGS. 4-8 and 12.

Seat 200 includes a lateral and longitudinal seat tracking system. Lateral movement is provided via first and second lateral tracking members 301, 302, which pass through through-holes 311-314 of stands 331-334 as depicted in FIG. 13. In certain embodiments, stands 331-334 are mechanically coupled to seat base 130 via a swivel plate 300, as depicted in FIG. 14. In some embodiments, stands 331-334 are mechanically coupled directly to seat base 130 without providing rotation via a swivel plate. First tracking block 110 and second tracking block 210 are coupled with, and oriented perpendicularly to, first and second lateral tracking members 301, 302 such that first and second tracking blocks 110, 210 move laterally in tandem with the first and second lateral tracking members 301, 302. Longitudinal movement is provided via first and second longitudinal tracking members 120, 220, which are mechanically coupled to bucket frame 135 and slide longitudinally through bores of first and second tracking blocks 110, 210, respectively.

FIG. 14 is a perspective view of swivel plate 300, FIG. 13, operatively coupled to seat 200. Swivel plate 300 is pivotally mounted to seat base 130 of seat 200. A first lateral tracking member 301 and a second lateral tracking member 302 are each attached to first tracking block 110 and second tracking block 210 via first lateral hole 101 and second lateral hole 102, FIG. 4, respectively. First lateral tracking member 301 passes through the through-holes of first stand 331 and second stand 332; likewise, second lateral tracking member 302 passes through the through-holes of third stand 333 and fourth stand 334. In operation, first and second lateral tracking members 301, 302 glide in a substantially lateral direction such that bucket frame 135 moves laterally with respect to seat base 130. A releasable locking mechanism may be used to secure seat 200 in a desired lateral position.

In embodiments having swivel plate 300, first and second lateral tracking members 301, 302 enable movement of bucket frame 135 laterally with respect to swivel plate 300 and in a variety of directions with respect to seat base 130 based on rotation of swivel plate 300. Similarly, longitudinal tracking members 120, 220 enable movement of bucket frame 135 longitudinally with respect to swivel plate 300 and in a variety of directions with respect to seat base 130 based on rotation of swivel plate 300. Rotation of swivel plate 300 moves everything above swivel plate 300 relative to seat base 130, which may be fixed to a floor. Therefore, lateral and longitudinal motion of the seat is independent from any rotating motion. In certain embodiments, swivel plate 300 rotates between a finite number of fixed positions.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A tracking system, comprising:
    a longitudinal member that is mechanically coupled to a first structure; and
    a block that is mechanically coupled to a second structure, the block comprising:
        a bore that passes longitudinally through the block and is adapted to receive the longitudinal member;
        a plain bearing mounted inside the bore for contacting the longitudinal member;
        a pair of opposing rollers mounted inside the bore for contacting the longitudinal member, such that the longitudinal member slides within the bore to enable the first structure to translate with respect to the second structure;
        the pair of opposing rollers comprises a first roller located in a first portion of the bore and a second roller located in a second portion of the bore, opposite the first portion, such that the longitudinal member slides between the first roller and the second roller; and
        the plain bearing includes a notch adapted to receive the first roller, such that the first roller is nested within the plain bearing.

2. The tracking system of claim 1, wherein the block is a single piece of material capable of adequately withstanding loads from a plurality of directions related to the functions of a chair.

3. A seat tracking system, comprising:
    a tracking member that extends longitudinally and is mechanically coupled to a first portion of a seat; and
    a tracking block that is mechanically coupled to a second portion of the seat, the tracking block comprising:
        a bore that passes longitudinally through the tracking block and is adapted to receive the tracking member;
        at least one plain bearing mounted inside the bore for contacting the tracking member;
        at least one pair of opposing rollers mounted inside the bore for contacting the tracking member, such that the tracking member slides within the tracking block to enable the first seat portion and the second seat portion to slide with respect to each other; and the at least one plain bearing and the at least one pair of opposing rollers are configured about the tracking member for withstanding eccentric and cantilever loading experienced under normal seat operation, thereby preventing binding of the tracking member within the tracking block.

4. The seat tracking system of claim 3, wherein the tracking block comprises a single piece of material lacking joints for sustaining forces applied during dynamic seat testing for aircraft.

5. The seat tracking system of claim 3, wherein the bore is formed by machining through the tracking block to form a cylindrical passageway longitudinally through the tracking block.

6. The seat tracking system of claim 5, wherein the tracking member comprises a cylindrical tube adapted for sliding longitudinally through the bore of the tracking block.

7. The seat tracking system of claim 3, wherein the first portion of the seat is a bucket frame for supporting a seat bottom, and the second portion of the seat is a seat base for mounting to a floor such that the tracking member slides longitudinally while the tracking block remains stationary.

8. The seat tracking system of claim 3, wherein the at least one pair of opposing rollers comprises a first pair of opposing rollers, the first pair of opposing rollers comprising:
a first roller located in a top portion of the bore and a second roller located in a bottom portion of the bore beneath the first roller such that the tracking member slides between the first roller and the second roller.

9. The seat tracking system of claim 8, wherein the at least one plain bearing includes a notch adapted to receive the first roller, such that the first roller is nested within the at least one plain bearing.

10. The seat tracking system of claim 8, wherein the at least one pair of opposing rollers further comprises a second pair of opposing rollers, the second pair of opposing rollers comprising:
a third roller located in a top portion of the bore and a fourth roller located in a bottom portion of the bore beneath the third roller such that the tracking member slides between the third and fourth roller.

11. The seat tracking system of claim 3, wherein the at least one plain bearing comprises a first plain bearing and a second plain bearing both mounted inside the bore along an upper portion of the bore.

12. The seat tracking system of claim 11, wherein the first plain bearing is mounted substantially near a first end of the bore and the second plain bearing is mounted substantially near a second end of the bore, opposite the first end.

13. A rotatable seat tracking system, comprising:
a swivel plate pivotally mounted to a seat base, the swivel plate comprising:
at least one stand having a through-hole;
a first roller supported in the at least one stand and exposed within a lower portion of the through-hole;
a second roller supported in the at least one stand opposite the first roller and exposed within an upper portion of the at least one through-hole; and
a plain bearing mounted inside the at least one through-hole; and
a tracking member mechanically coupled to a seat bucket frame and aligned through the at least one through-hole, such that the tracking member glides between the first roller and the second roller and is guided by the plain bearing, thereby enabling movement of the seat bucket frame with respect to the seat base.

14. The rotatable seat tracking system of claim 13, wherein the at least one stand comprises a first stand and a second stand each having a through-hole such that the through-hole of the first stand is aligned with the through-hole of the second stand.

15. The rotatable seat tracking system of claim 14, wherein the tracking member glides between a pair of opposing rollers in each of the first stand and the second stand, and the tracking member is guided by a plain bearing in each of the first stand and the second stand.

16. The rotatable seat tracking system of claim 13, wherein the tracking member enables movement of the seat bucket frame laterally with respect to the swivel plate and in a variety of directions with respect to the seat base based on rotation of the swivel plate.

17. A lateral and longitudinal seat tracking system, comprising:
a stand having a through-hole, the stand being mechanically coupled to a seat base;
a lateral tracking member aligned through the through-hole, such that the lateral tracking member is laterally moveable within the through hole;
a block mechanically coupled to the lateral tracking member, such that the block is laterally moveable; and
a longitudinal tracking member that is mechanically coupled to a seat bucket frame, wherein the block has a bore oriented longitudinally that is adapted to receive the longitudinal tracking member, such that the longitudinal tracking member is longitudinally moveable through the bore for moving the seat bucket frame longitudinally, and the block is laterally moveable for moving the seat bucket frame laterally.

18. The lateral and longitudinal seat tracking system of claim 17, wherein the stand has a first pair of opposing rollers inside the through-hole for the lateral tracking member to roll between, and the block has a second pair of opposing rollers inside the bore for the longitudinal tracking member to roll between.

19. The lateral and longitudinal seat tracking system of claim 17, wherein the stand has a first plain bearing located inside the through-hole for guiding the lateral tracking member, and the block has a second plain bearing located inside the bore for guiding the longitudinal tracking member.

20. The lateral and longitudinal seat tracking system of claim 19, wherein the first plain bearing and the first pair of opposing rollers are configured about the lateral tracking member for withstanding eccentric and cantilever loading experienced under normal seat operation, thereby preventing binding of the lateral tracking member within the stand.

21. The lateral and longitudinal seat tracking system of claim 17, further comprising a swivel plate mechanically coupled between the stand and the seat base such that the seat bucket frame is rotatable.

* * * * *